Fig. 1.
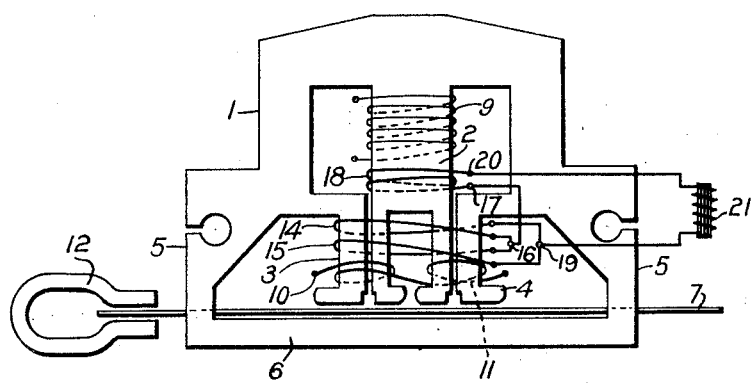
Fig 2.
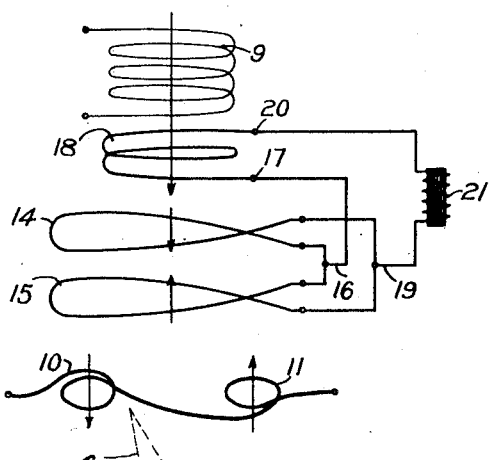
Fig. 3.
Class II
compensating flux.
Class I
compensating flux
Resultant flux caused
by compensating coils.
WITNESSES:
INVENTOR
Montgomery Knight.
BY Wesley G. Carr
ATTORNEY Patented Oct. 30, 1928.

1,689,785

UNITED STATES PATENT OFFICE

MONTGOMERY KNIGHT, OF HOLYOKE, MASSACHUSETTS, ASSIGNOR TO WESTINGHOUSE ELECTRIC AND MANUFACTURING COMPANY, A CORPORATION OF PENNSYLVANIA.

TEMPERATURE-COMPENSATING DEVICE.

Application filed October 29, 1925. Serial No. 65,633.

My invention relates to compensating means for electro-responsive devices and particularly to means for compensating electric meters or flux producing elements for the effects of varying conditions, such as temperature changes thereon.

One object of my invention is to provide a device of the above-indicated character, that shall compensate induction meters of the watthour type for errors in both magnitude and direction of one of the component fluxes thereof.

Another object of my invention is to provide compensating means that shall permit the use of a variety of series-actuating coils for the meter.

Another object of my invention is to provide a compensating device that shall be simple and durable in construction and effective in its operation.

In the copending application, means disposed on the series poles and connected to the series winding are shown for compensating the meter for temperature variations. This construction, while suitable for many applications, may not be so well adapted for others and it is, accordingly, my aim in this invention to increase the variety of uses for which the invention may be employed.

For instance, in portable watthour meters, there are usually provided a relatively large number of series coils for selective use. In certain instances, some of these series windings are of different current ratings and it would therefore, not be advantageous to employ the system as shown in the copending application, in which the compensating coils are connected to the series coils of a watthour meter having only two permanently mounted series coils thereon.

In practicing my present invention, I provide compensating coils on the series poles of a watthour meter that are so energized from the voltage coils as to render them independent of the series windings.

Figure 1 of the accompanying drawings is a diagrammatic view of the circuits and core structure of a watthour meter embodying my invention, Fig. 2 is a simplified diagrammatic view of the circuits shown in Fig. 1, and Fig. 3 is a vector diagram of the actuating and compensating fluxes, as effected by my invention.

The device comprises, in general, a core member 1 having a shunt pole portion 2, series pole portions 3 and 4, side portions 5 and a portion 6, connecting the side portions 5, between which and the series-pole portions 3 and 4 a usual disc armature 7 is adapted to rotate.

A usual shunt or voltage winding 9 and series windings 10 and 11 are provided on the pole portions 2, 3 and 4, respectively, and a usual damping magnet 12 is provided for the disc 7.

In accordance with my invention, the series pole portions 3 and 4, in addition to the usual series windings 10 and 11, are provided with differentially-related coils 14 and 15 of different temperatures coefficients, each surrounding both of the series pole portions 3 and 4. A common terminal 16 of the coils 14 and 15 is connected to a terminal 17 of an auxiliary coil 18 mounted on the shunt pole portion 2 adjacent to the winding 9. Another common terminal 19 of the coils 14 and 15 is connected to the other terminal 20 of the coil 18 through an adjusting impedance device or a reactor 21.

The coils 14 and 15 are so constructed and related as to normally produce equal and opposite fluxes, as indicated by arrows, at a given temperature. The reactance of the reactor 21 is of such value as to properly determine the phase angle of the resultant compensating flux with respect to the shunt flux so as to give the proper ratio of component fluxes for errors of both magnitude, and direction or phase angle between the operating fluxes of the meter. In other words, compensation is effected for both Class I and Class II errors. Class I errors may be considered errors arising by virtue of variations in the magnitude of the voltage flux. Class II errors may be considered errors due to variations in the phase angle relationship between the voltage and the current fluxes.

Referring to Figure 3, vector $\phi_I$ represents the current flux traversing the disc 7 from the current coils 10 and 11, $\phi_E$ represents the voltage flux traversing the disc 7, and $\phi_E 1$ represents the voltage flux that would traverse the disc were it not for the compensating flux $\phi_C$ that co-operates with the flux $\phi_E 1$ to cause the flux $\phi_E$ to be 90° out of phase with $\phi_I$ under various temperatures.

It is well known that, with a change in temperature, a corresponding change takes place in the magnitude and phase angle of the voltage flux with respect to the current flux. For purposes of illustration, let it be supposed that a temperature other than normal causes the voltage flux $\phi_E 1$ to take a position as shown in Figure 3. Such a condition would produce an inaccurate movement in the disc 7. However, the compensating coils are adapted to cause the flux $\phi_E 1$ to be varied in magnitude and phase position by the flux $\phi_C$ to take a position and magnitude $\phi_E$ to affect the disc substantially as if no change in temperature had taken place.

In operation, so long as the temperature remains at the point at which the meter has been calibrated, the coils 14 and 15 produce equal and opposite fluxes and, therefore, have no effect on the operation of the meter. However, should a change from this temperature occur, the fluxes of the coils 14 and 15 become unbalanced, in accordance with the change, to maintain the operation of the meter substantially in accordance with the load independently of the temperature change, as indicated in the diagram of Fig. 3.

The compensating coils 14 and 15 being thus independent of the current in the series windings 10 and 11, other series coils of the same or different current-carrying capacities may be added to the meter. In other words, any combination of series windings may be employed without affecting the operation of the compensating coils 14 and 15.

While I have shown and described a particular form of my invention, changes may be effected therein without departing from the spirit and scope thereof as set forth in the appended claims.

I claim as my invention:

1. The combination with a flux-producing element, of flux-producing means including differentially related windings inductively excited thereby and responsive to temperature variations for compensating said element for changes caused by temperature variations in the flux thereof.

2. The combination with a plurality of co-operating flux-producing elements, of flux-producing means including differentially related windings inductively energized by one of said elements and responsive to temperature variations for compensating said element for changes caused by temperature variations in the flux thereof.

3. The combination with a plurality of co-operating flux-producing elements, of flux-producing means including differentially related windings associated with one of said elements, and means associated with another of said elements for energizing said flux-producing means, the flux-producing means being responsive to temperature variations to compensate one of said flux-producing elements for changes caused by temperature variations in the flux thereof.

4. In combination, an element adapted to be affected by flux, and means including differentially related windings excited by flux from said element to produce flux compensating said element for a change from a given condition but ineffective to produce effective flux while said condition maintains.

5. The combination with a plurality of co-operating flux-producing elements, of flux-producing means including differentially related windings associated with one of said elements and energized by another thereof, said means being ineffective to produce effective flux under a given condition while energized, and effective to produce flux in response to, and to compensate for, a change in said condition.

6. In an alternating-current instrument, the combination with means for producing actuating and controlling fluxes, of means including differentially related windings inductively energized by one of said means for controlling the phase relation between the actuating fluxes at a given power factor and for producing normally equal and opposite fluxes at a given temperature which become unbalanced to produce flux to compensate the instrument for a change in flux magnitude and phase caused by temperature change.

7. In an alternating-current meter, the combination with a core member, and shunt and series windings thereon, of an auxiliary circuit including differentially-related coils of different temperature co-efficients associated with one of said windings, and means for energizing said coils comprising a coil inductively associated with another of said windings.

8. In an alternating-current meter, the combination with a core member, and shunt and series windings thereon, of an auxiliary circuit including differentially-related coils of different temperature co-efficients associated with the core member, means for varying the impedance of the auxiliary circuit, and means for energizing said coils comprising a coil inductively associated with the core member.

9. In an alternating-current meter, the combination with shunt and series windings, of an auxiliary circuit including differentially-related coils of different temperature co-efficients, and means for energizing said coils comprising a coil inductively associated with the shunt winding.

10. In an alternating-current meter, the combination with a core member having a shunt-pole portion and two series-pole portions, and shunt and series windings thereon, of differentially-related coils of different temperature co-efficients energized from one of said windings and each surrounding both of said series pole portions.

In testimony whereof, I have hereunto subscribed my name this 30th day of September 1925.

MONTGOMERY KNIGHT.